Patented Nov. 5, 1929

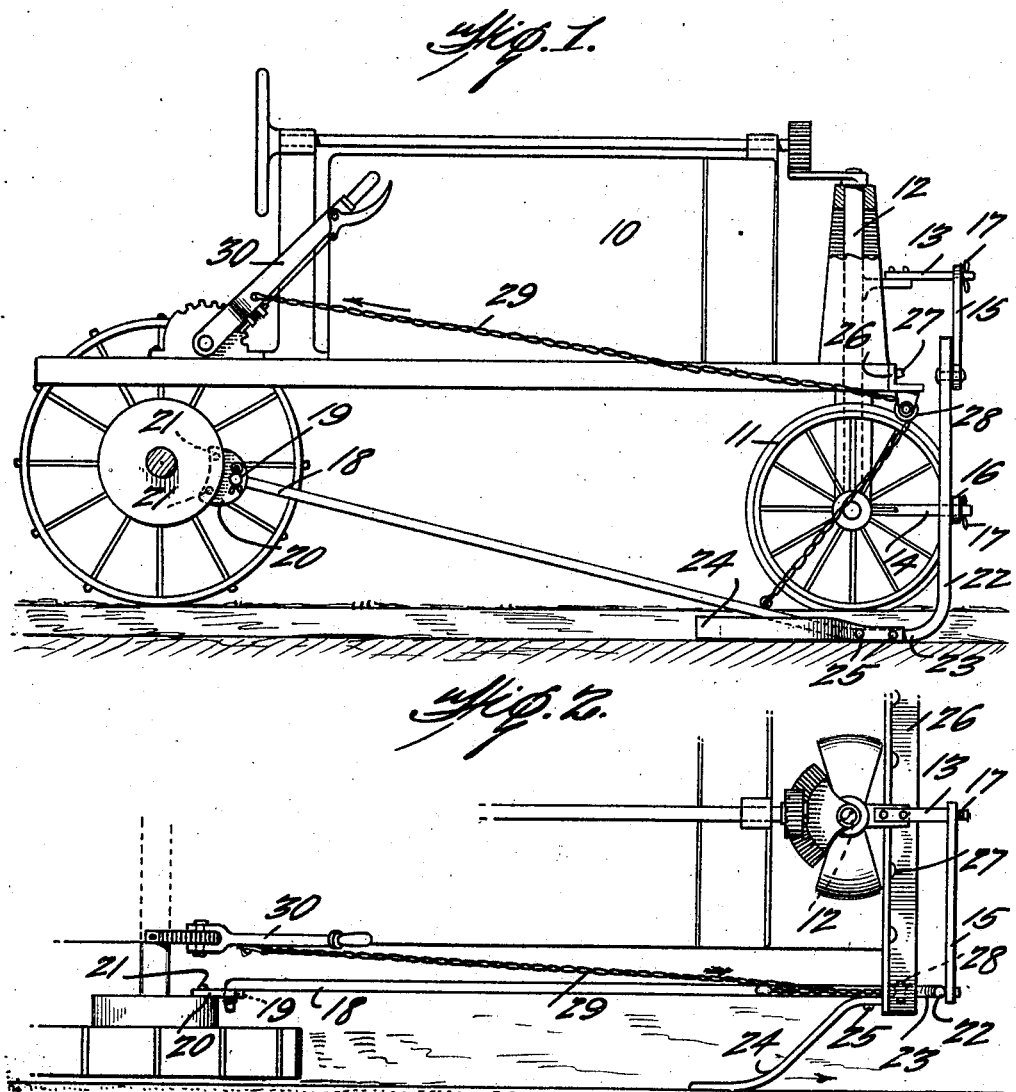

1,734,151

UNITED STATES PATENT OFFICE

LLOYD BAKER, OF SLAYTON, MINNESOTA, ASSIGNOR TO KELLY BROS. CO., A COPARTNERSHIP CONSISTING OF LEO. A. KELLY, OF MILWAUKEE, WISCONSIN, RAY F. KELLY, OF WASECA, MINNESOTA, AND MARK KELLY, OF MANKATO, MINNESOTA

GUIDING DEVICE FOR TRACTORS

Application filed December 18, 1928. Serial No. 326,728.

This invention relates to steering devices for tractor engines, especially when associated with plows, and it has for an object the provision of novel means operating in conjunction with a furrow for steering the tractor in a course parallel with the furrow.

It is a further object of this invention to provide novel means whereby a steering mechanism of the character indicated may be attached to a tractor to permit of adjustment with respect to the tractor and to support the steering device in inoperative position when the same is not to be used.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views and in which—

Figure 1 illustrates a view in side elevation, showing a fragment of a tractor with a device embodying the invention applied thereto; and Figure 2 illustrates a top plan view.

In these drawings, 10 denotes a type of tractor having steering wheels 11, associated with a vertically disposed shaft 12. A rod 13 is anchored to the shaft above the steering wheels and another rod 14 is appropriately anchored to the shaft between the steering wheels and these rods project forwardly beyond the steering wheels. Links 15 and 16 are provided with apertures to receive the respective rods, and the links are pivotally mounted on the said rods and they may be secured thereon in any appropriate way, as by the use of cotter pins 17 projecting through apertures of the rods. The outer ends of these rods are pivotally connected to a guide, preferably a pipe, in the interests of making the attachment comparatively light. The rear end 18 of this guide terminates in proximity to the brake housing of the tractor and it has an angularly disposed end pivoted in an aperture 19 of a bracket 20 which is secured on the housing in any appropriate way, as by fastenings 21. The forward end 22 of the guide extends vertically where the links are pivoted to it, and the vertically disposed portion merges with a curved portion 23, intended to travel in a furrow.

The curved portion of the guide is supplied with an auxiliary guide 24 whose inner end is attached to the guide rearwardly of its bent portion by fastenings 25, such as rivets, and the said auxiliary guide diverges from the first mentioned guide and has a free end which terminates in spaced relation to the straight portion of the first mentioned guide and on a plane lower than the rearwardly extending portion of the first mentioned guide. The curved portion of the guide is intended to engage the bottom of the furrow and the side or vertical wall thereof, whereas the auxiliary guide which is yielding rides against the surface of the soil that has been turned and exerts pressure laterally of the furrow to hold the guide in operative relation with the bottom of the furrow.

A beam or angle iron 26 is secured to the front of the tractor by appropriate anchoring means 27, such as bolts or the like, and it extends to one side of the tractor toward the guide but elevated with respect to it. A pulley 28 is suspended or supported from the end of the beam and a flexible element 29, such as a chain, cable or the like, operates over the said pulley. The element 29 will be connected to the rearwardly extending portion of the guide and when pull is exerted on it, it will serve to elevate the said guide and it will be supported in said elevated position by the links and the said flexible member. A lever 30 may be pivotally mounted at the rear of the tractor near the driver's seat and the flexible element will be connected to it so that when the lever is moved rearwardly, it will pull the flexible element and elevate the guide.

I claim:

1. In a guiding device for tractors, a rigid member pivotally mounted near the rear end of the tractor, said member extending toward the forward end of the tractor and being curved between its ends with its front end extending approximately vertically, the said curved portion being adapted to ride on the bottom of a furrow for guiding the tractor, a resilient device having one end secured to the rigid member near the location of the curve, the said resilient member extending rearwardly and laterally of the rigid member for engaging soil at one side of the furrow and holding the rigid member in operative position in the furrow, a steering element for the front wheels of the tractor, and means for connecting the rigid member to said steering element.

2. In a guiding device for tractors, a rigid member pivotally mounted near the rear end of the tractor, said member extending toward the forward end of the tractor and being curved between its ends with its front end extending approximately vertically, the said curved portion being adapted to ride on the bottom of a furrow for guiding the tractor, a resilient device having one end secured to the rigid member near the location of the curve, the said resilient member extending rearwardly and laterally of the rigid member for engaging soil at one side of the furrow and holding the rigid member in operative position in the furrow, a steering element for the front wheels of the tractor, rods attached to said steering element and projecting therefrom, links oscillatably mounted on the said rods, and means for pivotally connecting the links to the rigid member.

3. In a guiding device for tractors, a rigid member pivotally mounted near the rear end of the tractor, said member extending toward the forward end of the tractor and being curved between its ends with its front end extending approximately vertically, the said curved portion being adapted to ride on the bottom of a furrow for guiding the tractor, a resilient plate having its forward end secured to the rigid member rearwardly of the curved portion of the rigid member, said plate projecting rearwardly and laterally of said rigid member for engaging soil at one side of the furrow and holding the rigid member in operative position in the furrow, a steering element for the front wheels of the tractor, and means for connecting the rigid member to said steering element.

LLOYD BAKER.